(12) United States Patent
Döring

(10) Patent No.: US 7,408,115 B2
(45) Date of Patent: Aug. 5, 2008

(54) DEVICE HAVING A SEALING GROMMET FOR LEADS TO PASS THROUGH BETWEEN VEHICLES PARTS THAT CAN MOVE IN RELATION TO ONE ANOTHER

(75) Inventor: Bernd Döring, Gifhorn (DE)

(73) Assignee: Volkswagen AG, Wolfsburg (DE)

( * ) Notice: Subject to any disclaimer, the term of this patent is extended or adjusted under 35 U.S.C. 154(b) by 387 days.

(21) Appl. No.: 11/334,163

(22) Filed: Jan. 18, 2006

(65) Prior Publication Data

US 2006/0162798 A1    Jul. 27, 2006

(30) Foreign Application Priority Data

Jan. 18, 2005 (DE) ............ 10 2005 002 258
Jul. 19, 2005 (DE) ............ 10 2005 033 621

(51) Int. Cl.
H01B 7/06 (2006.01)
(52) U.S. Cl. ............... 174/72 A; 174/69; 174/72 R; 174/72 C
(58) Field of Classification Search ........... 174/72 R, 174/72 A, 71 R, 72 C, 69, 135; 191/23, 12 R
See application file for complete search history.

(56) References Cited

U.S. PATENT DOCUMENTS

| | | | | |
|---|---|---|---|---|
| 2,909,198 | A * | 10/1959 | Kramer et al. | 138/109 |
| 5,448,017 | A * | 9/1995 | Nakajima et al. | 174/152 G |
| 5,951,093 | A | 9/1999 | Proschek | 296/152 |
| 6,051,790 | A * | 4/2000 | Takeuchi et al. | 174/72 A |
| 6,107,570 | A * | 8/2000 | Suzuki et al. | 174/72 A |
| 6,278,060 | B1 * | 8/2001 | Mori | 174/650 |
| 6,354,651 | B1 * | 3/2002 | Mori | 296/146.1 |
| 6,479,748 | B2 * | 11/2002 | Mori | 174/651 |
| 6,901,627 | B2 * | 6/2005 | Uchida | 16/2.1 |
| 2002/0046863 | A1 * | 4/2002 | Heranney | 174/65 G |
| 2002/0114880 | A1 | 8/2002 | Dreistein et al. | 427/8 |

FOREIGN PATENT DOCUMENTS

| | | |
|---|---|---|
| DE | 33 40 664 A * | 5/1985 |
| DE | 3340664 A1 | 5/1985 |
| DE | 19717041 | 4/1997 |
| DE | 101 01 014 A1 | 7/2002 |
| DE | 200 22 922 U1 | 10/2002 |
| EP | 0812733 A2 | 12/1997 |
| EP | 0812734 A1 | 12/1997 |

(Continued)

OTHER PUBLICATIONS

European Search Report EP05021929, 7 pages, Mar. 2, 2006.

*Primary Examiner*—William H Mayo, III
(74) *Attorney, Agent, or Firm*—Baker Botts L.L.P.

(57) ABSTRACT

A sealing grommet for leads to pass through between vehicle parts that can move in relation to one another has two fixing devices for being sealed against an opening in the respective vehicle part and an elastic sealing bellows designed between the fixing devices. A sealing grommet of this type is created such that the installation space required for the sealing grommet between the vehicle parts is minimized. To this end, a return spring (15) for the lead guided in the sealing grommet (1) is supported on one fixing device (3) and is fixed on the lead at a distance from the sealing bellows (4).

18 Claims, 2 Drawing Sheets

FOREIGN PATENT DOCUMENTS

| | | |
|---|---|---|
| EP | 0855312 A2 | 7/1998 |
| EP | 1544046 A1 | 6/2005 |
| FR | 2 641 820 | 1/1989 |
| FR | WO 2006/048737 A2 * | 5/2006 |
| GB | 2 149 469 A | 6/1985 |
| JP | 10285764 | 10/1998 |
| JP | 2002-374609 A * | 12/2002 |
| JP | 2002354634 | 12/2002 |

* cited by examiner

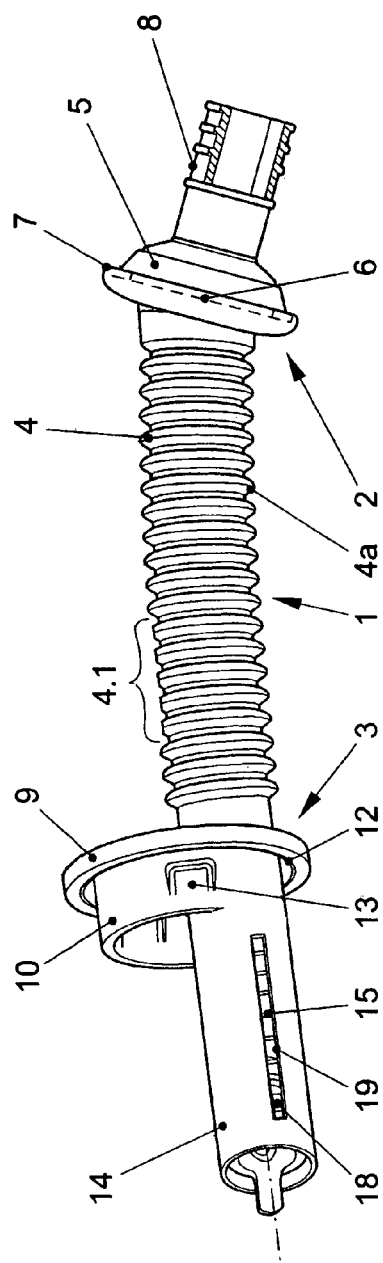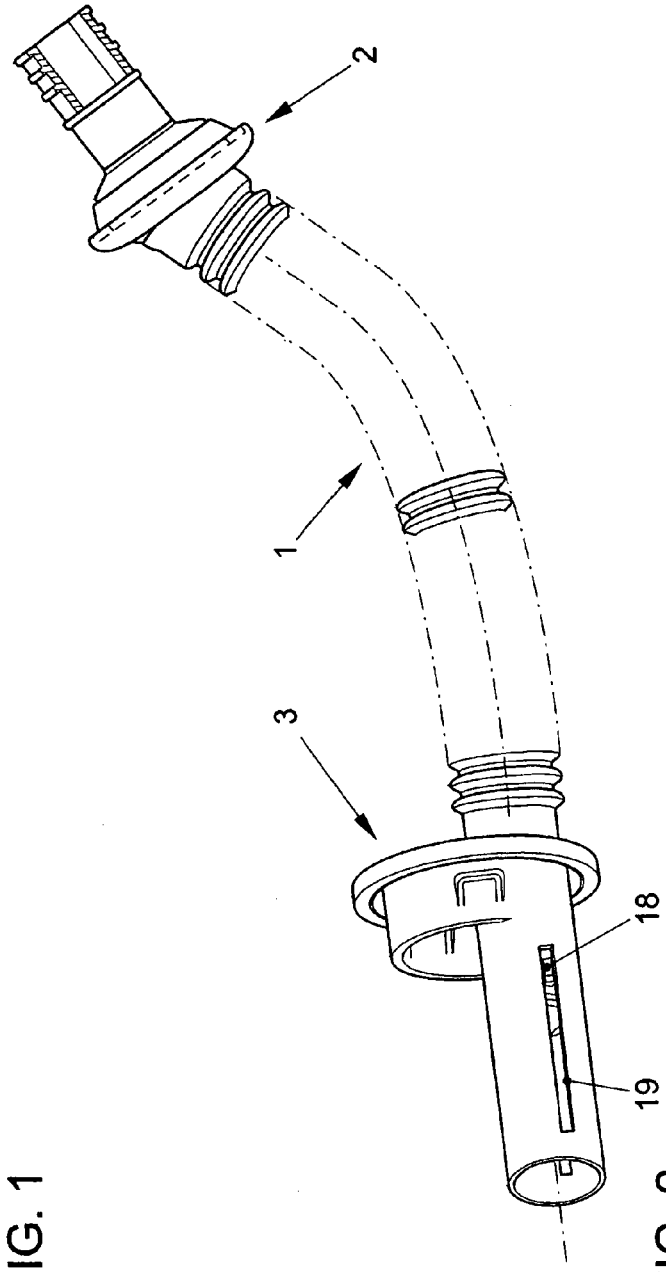
FIG. 1
FIG. 2

DEVICE HAVING A SEALING GROMMET FOR LEADS TO PASS THROUGH BETWEEN VEHICLES PARTS THAT CAN MOVE IN RELATION TO ONE ANOTHER

PRIORITY

This application claims priority from German Patent Application No. DE 10 2005 002 258.8 which was filed on Jan. 18, 2005, and DE 10 2005 033 621.3 which was filed on Jul. 19, 2005, which are incorporated herein by reference in their entirety.

TECHNICAL FIELD

The present invention relates to a device having a sealing grommet for leads to pass through between vehicle parts that can move in relation to one another, particularly for passing a lead-through between a vehicle bodywork part and a vehicle attachment part, such as a vehicle door or a vehicle tailgate.

BACKGROUND

Such devices preferably serve to pass a lead and/or a lead-through (lead-through in the following description) while protecting it from moisture and contamination through an open space existing between the vehicle parts, where moisture and contamination impinge on said open space. These devices each have a fixing device for being arranged on the respective vehicle part and a bellows (sealing bellows) or the like between the fixing devices. Said bellows (sealing bellows) enables a relative movement between the fixing devices and/or the vehicle parts. Usually, the fixing devices are molded on the sealing bellows and are provided with a conical catch extension, a lip seal and an annular groove designed between the conical catch extension and the lip seal for being fixed tightly against the opening in the respective vehicle part wall. The respective fixing device can be additionally provided with a catch frame using which the fixing device can be tightly fixed against the edge surrounding the opening in the respective vehicle part wall. The catch frame serves to facilitate the assembly and to ensure a reliable fixation, particularly in a narrow installation space. In order to enable a relative movement by changing the distance between the vehicle parts, the sealing grommets must be flexible and must be dimensioned appropriately. Furthermore, they require an installation space in which they can assume a rest position in the smallest distance between the vehicle parts, out of which they can follow an increase in the distance. Examples of sealing grommets can be found in the patent applications DE 200 22 922 U1, DE 33 40 664 A1 and DE 101 01 014 A1.

SUMMARY

The object of the present invention is to design a device having a sealing grommet for leads to pass through between vehicle parts that can move in relation to one another such that the installation space required for said sealing grommet between the vehicle parts is minimized.

This object can be achieved by a device with a sealing grommet for passing through a lead or a lead-through between vehicle parts that can move in relation to one another, comprising fixing devices each of which can be sealed against an opening in a respective vehicle part, an elastic sealing bellows designed between the fixing devices, and a return spring for the lead or the lead-through guided in the sealing grommet which is supported on one of the fixing devices and fixed on the lead at a distance from the elastic sealing bellows.

The return spring can be a pressure spring that is supported on its side that is turned away from the sealing bellows on the one fixing device. The one fixing device can be provided with a catch frame for being arranged in the opening provided for the one fixing device, the return spring can be supported against the catch frame and the sealing grommet is tightly connected to the catch frame, and said catch frame may comprise a guide extension for the return spring. The catch frame and the opening can be oval-shaped. A connecting element can be arranged in the guide extension such that it can move longitudinally, and the return spring and the lead can be tightly connected using the connecting element. The guide extension and the connecting element can be cylindrically hollow and the connecting element can be provided with two sliding rings of which the sliding ring located on the side of the sealing bellows simultaneously forms a resting shoulder on the side of the sealing bellows for the return spring. The lead or the lead-through can be tightly connected to the other fixing device. The sealing bellows may comprise folds arranged in the longitudinal direction where at least one part of the folds is flattened for resting against the moveable vehicle part. The lead or the lead-through at least in the region of the sealing bellows comprises a casing capable of sliding.

The present invention relates to a sealing grommet formed out of a sealing bellows and fixing devices that are arranged at both ends of the sealing bellows. Said sealing grommet is designed for leads to pass through between vehicle parts that can move in relation to one another, where the fixing devices are sealed against each of the openings designed on the respective vehicle part. A return spring for the lead guided in the sealing grommet is arranged on one of the fixing devices. Said return spring is fixed on the lead at a distance from the fixing device. The length of the sealing bellows is adjusted to the distance between the vehicle parts. The return spring ensures that the lead is held tautly even in case of a change in the distance between the vehicle parts. The return spring ensures that the lead is restored in case of a reduction in the distance between the vehicle parts. The retraction of the lead into its resting position that exists in case of the design-dependent minimum distance between the vehicle parts is associated with a reduction in the length of the elastic sealing bellows. The length of the sealing bellows in the resting position of the lead is the initial length of the sealing bellows and it determines the length of the sealing grommet. The sealing grommet carries out a defined expanding movement due to the tautly guided lead when the distance between the vehicle parts increases. Thus the installation space required for the sealing grommet is effectively reduced.

The return spring is preferably a pressure spring that is supported with its side that is turned away from the sealing bellows on the fixing device. Said pressure spring can be easily pre-tensioned in the initial position in which there is a minimum distance between the vehicle parts. Using this spring arrangement, it is possible for the sealing bellows to expand and contract in an unobstructed manner.

The fixing device can be provided with a catch frame for being arranged in the opening provided for the fixing device. The return spring is supported on one side of the catch frame and the sealing grommet is also tightly joined to the catch frame. The catch frame is preferably oval-shaped so that it can be arranged in a twist-proof manner in an opening that corresponds to the periphery and design of the catch frame. This design helps ensure a defined arrangement and movement.

In order to achieve an unobstructed and defined motion sequence of the lead when the distance between the vehicle parts changes and for a defined arrangement of the return spring, it is expedient if the catch frame comprises a guide extension in which a connecting element is arranged between the return spring and the guide such that it can move longitudinally. The guide extension and the connecting element can be designed as hollow cylinders where the connecting element is provided with two sliding rings, of which the sliding ring located on the side of the sealing bellows simultaneously forms a resting shoulder on the side of the sealing bellows for the return spring. In this manner the return spring and also the lead surrounded by the return spring are guided securely. The defined motion sequence of the sealing grommet can be additionally ensured by firmly connecting even the second fixing device to the lead.

In an additional preferred embodiment of the present invention, at least one part of the folds of the sealing bellows, particularly in the region of the bending radius when the vehicle parts have moved away in relation to one another, is flattened.

Furthermore, it is possible to provide the lead or the lead-through at least in the region of the sealing bellows with a casing that is capable of sliding or a casing having a material that is capable of sliding.

BRIEF DESCRIPTION OF THE DRAWINGS

The present invention is explained in the following description on the basis of an embodiment. The associated drawings illustrate the following:

FIG. 1: a sealing grommet in its initial state,
FIG. 2: a sealing grommet in its expanded state.

DETAILED DESCRIPTION

Figure 3:
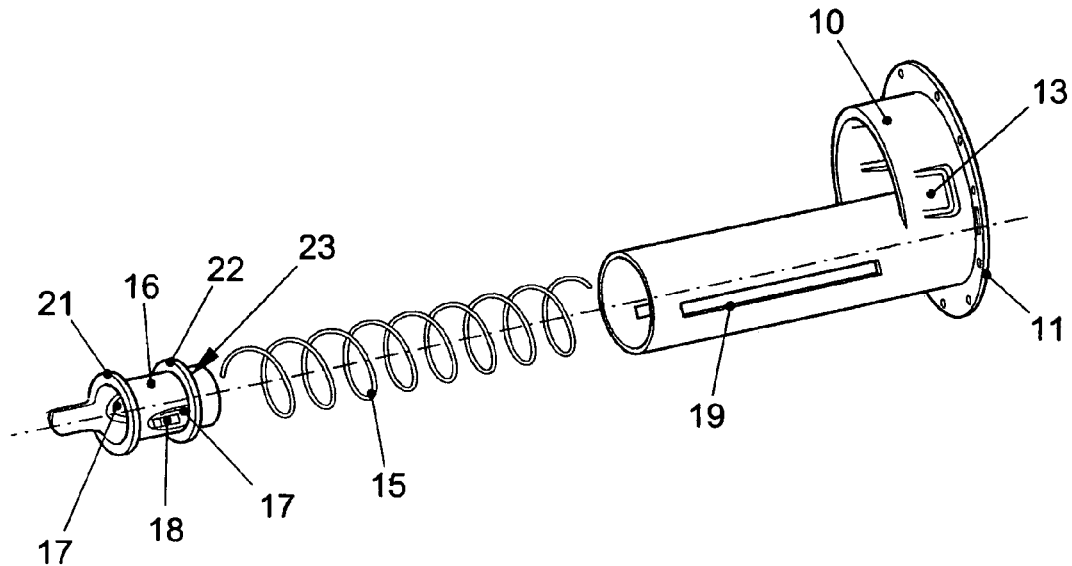
FIG. 3: a catch frame in an exploded view.

The device illustrated in FIG. 1 having a sealing grommet 1 for leads to pass through between a vehicle bodywork and a tailgate of a vehicle comprises two fixing devices 2 and 3. Said fixing devices 2 and 3 can each be sealed against an opening designed in the respective vehicle part. The device also comprises a sealing bellows 4 having folds 4a made out of a rubber-elastic material. Said sealing bellows 4 is arranged on the fixing devices 2, 3. At least the part of the folds 4.1 of the sealing bellows that is located in the region of the bending radius of the sealing bellows is flattened. The fixing device 2, for being arranged in the hinge area of the tailgate, consists of a conical plug 5. A concentric groove 6 indicated by the dashed lines is attached to the conical plug on the side of the sealing bellows. Also a concentric sealing lip 7 for buttoning (6) into the respective opening and for resting (7) tightly against the edge of the opening is also attached to the conical plug on the side of the sealing bellows. A cylindrically hollow guide extension 8 is attached to the side of the conical plug that is turned away from the sealing bellows 4. The sealing grommet can be firmly connected to the lead-through (not illustrated) by means of the guide extension 8. The fixing device 3 is formed out of an oval plate-like receiving part 9 that is molded on the sealing bellows 4 and an oval catch frame 10. The receiving part 9 tightly surrounds a flange (11, FIG. 3) designed on the catch frame 10. A sealing lip 12 is provided on the side of the catch frame that is turned away from the sealing bellows 4 for resting against the edge surrounding an oval opening in the vehicle bodywork.

On its peripheral side, the catch frame 10 comprises two catch tongues 13 that are designed opposite to one another, mesh with the edge of the oval opening in the vehicle bodywork in the assembled state and fix the fixing device 3. The catch frame 10 also comprises a cylindrically hollow guide extension 14 in which a pressure spring 15 and a cylindrically hollow connecting element (16, FIGS. 3, 4) are arranged such that said connecting element is capable of a longitudinal movement. The connecting element firmly connects the lead and the pressure spring 15 at a distance from the sealing bellows. In order to ensure its twist-proof longitudinal movement, the connecting element 16 is provided with two laterally designed catch tongues (17, FIGS. 3, 4) having catch projections 18 pointing outwards. Said catch projections 18 each mesh with an elongated slot 19 designed in the guide extension 14 and thus restrict the longitudinal movement of the connecting element 16, particularly in the direction away from the sealing bellows 4.

Figure 4:
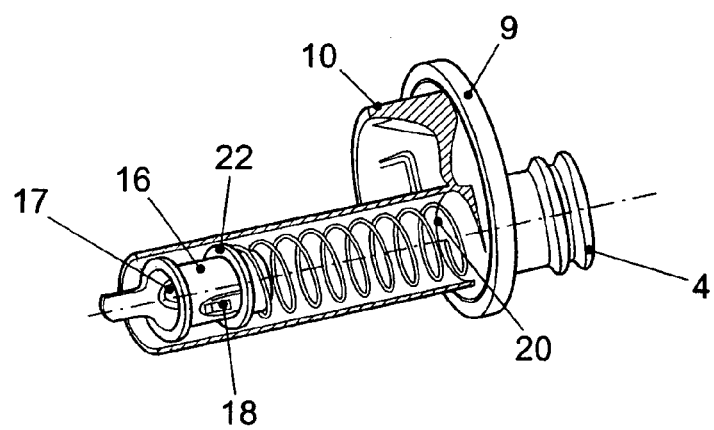
FIG. 4: cut section of a catch frame in the assembled state.

FIGS. 3 and 4 illustrate the design form of the fixing device 3. The pressure spring 15 used as a return spring is supported against an annular resting shoulder 20 designed in the catch frame 10 and against the connecting element 16 and can be pre-tensioned easily. The connecting element 16 is provided with two sliding rings 21, 22, of which the sliding ring located on the side of the sealing bellows simultaneously forms a resting shoulder 23 on the side of the sealing bellows for the pressure spring 15. In FIG. 4, the connecting element 16 is illustrated in its initial state (FIG. 1) in which the tailgate is closed.

When the tailgate is opened, the distance between the tailgate and the vehicle bodywork increases and so does the distance of the fixing device 2 having the lead-through that is firmly connected to the guide extension 8 from the fixing device 3.

The lead-through pulls the connecting element 16 that is firmly connected to it against the force of the pressure spring 15 in the direction of the sealing bellows 4 at the most up to the stop for the respective catch projection 18. Said stop is formed by the end of the respective elongated slot 19 located on the side of the sealing bellows. In doing so the sealing bellows 4 is expanded in a twist-proof and elastic manner. When closing the tailgate, the distance between the fixing devices 2 and 3 reduces again. The pressure spring pushes the connecting element 16 away from the contracting sealing bellows 4 and pulls the lead-through along up to its defined initial position (FIG. 1), where the contraction of the sealing bellows 4 is supported by the fixing device 2, which is tightly connected to the lead-through.

LIST OF REFERENCE SYMBOLS

1 Sealing grommet
2 Fixing device
3 Fixing device
4 Sealing bellows
4a Folds
4.1 Flattened folds
5 Plug
6 Groove
7 Sealing lip
8 Extension
9 Receiving part
10 Catch frame
11 Flange
12 Sealing lip
13 Catch tongue
14 Guide extension
15 Pressure spring
16 Connecting element
17 Catch tongue 18 Catch projection
19 Elongated slot
20 Resting shoulder
21 Sliding ring
22 Sliding ring
23 Resting shoulder

What is claimed is:

1. A device with a sealing grommet for passing through a lead or a lead-through between vehicle parts that can move in relation to one another, comprising:
    fixing devices each of which can be sealed against an opening in a respective vehicle part,
    an elastic sealing bellows designed between the fixing devices, and
    a return spring for the lead or the lead-through guided in the sealing grommet which is supported on one of the fixing devices and fixed on the lead at a distance from the elastic sealing bellows.

2. A device according to claim 1, wherein the return spring is a pressure spring that is supported on its side that is turned away from the sealing bellows on the one fixing device.

3. A device according to claim 1, wherein the one fixing device is provided with a catch frame for being arranged in the opening provided for the one fixing device, the return spring is supported against the catch frame and the sealing grommet is tightly connected to the catch frame, and said catch frame comprises a guide extension for the return spring.

4. A device according to claim 3, wherein the catch frame and the opening are oval-shaped.

5. A device according to claim 3, wherein a connecting element is arranged in the guide extension such that it can move longitudinally, and the return spring and the lead are tightly connected using the connecting element.

6. A device according to claim 5, wherein the guide extension and the connecting element are cylindrically hollow and the connecting element is provided with two sliding rings of which the sliding ring located on the side of the sealing bellows simultaneously forms a resting shoulder on the side of the sealing bellows for the return spring.

7. A device according to claim 1, wherein the lead or the lead-through is tightly connected to the other fixing device.

8. A device according to claim 1, wherein the sealing bellows comprises folds arranged in the longitudinal direction where at least one part of the folds is flattened for resting against the moveable vehicle part.

9. A device according to claim 1, wherein the lead or the lead-through at least in the region of the sealing bellows comprises a casing capable of sliding.

10. A sealing device for passing through a lead or a lead-through between vehicle parts that can move in relation to one another, comprising:
    first and second fixing devices each of which can be sealed against first and second openings in a respective vehicle part,
    an elastic sealing bellows designed between the first and second fixing devices, and
    a return spring for the lead or the lead-through guided in the sealing device which is supported on the first fixing device and fixed on the lead at a distance from the elastic sealing bellows.

11. A sealing device according to claim 10, wherein the return spring is a pressure spring that is supported on its side that is turned away from the sealing bellows on the first fixing device.

12. A sealing device according to claim 10, further comprising a catch frame arranged in the first opening, the return spring being supported against the catch frame and the sealing device is tightly connected to the catch frame, and said catch frame comprises a guide extension for the return spring.

13. A sealing device according to claim 12, wherein the catch frame and the opening are oval-shaped.

14. A sealing device according to claim 12, wherein a connecting element is arranged in the guide extension such that it can move longitudinally, and the return spring and the lead are tightly connected using the connecting element.

15. A sealing device according to claim 14, wherein the guide extension and the connecting element are cylindrically hollow and the connecting element is provided with two sliding rings of which the sliding ring located on the side of the sealing bellows simultaneously forms a resting shoulder on the side of the sealing bellows for the return spring.

16. A sealing device according to claim 10, wherein the lead or the lead-through is tightly connected to the second fixing device.

17. A sealing device according to claim 10, wherein the sealing bellows comprises folds arranged in the longitudinal direction where at least one part of the folds is flattened for resting against the moveable vehicle part.

18. A sealing device according to claim 10, wherein the lead or the lead-through at least in the region of the sealing bellows comprises a casing capable of sliding.

* * * * *